SR
9/25/84 XR 4,473,825

United States Patent [19]
Walton

[11] Patent Number: 4,473,825
[45] Date of Patent: Sep. 25, 1984

[54] ELECTRONIC IDENTIFICATION SYSTEM WITH POWER INPUT-OUTPUT INTERLOCK AND INCREASED CAPABILITIES

[76] Inventor: Charles A. Walton, 19115 Overlook Rd., Los Gatos, Calif. 95030

[21] Appl. No.: 355,187

[22] Filed: Mar. 5, 1982

[51] Int. Cl.³ .................................... H04Q 9/00

[52] U.S. Cl. .................... 340/825.54; 340/825.34; 235/380

[58] Field of Search .................. 340/825.54, 825.34, 340/38 L; 235/380; 343/6.5 R, 6.5 SS

[56] References Cited

U.S. PATENT DOCUMENTS

| | | | |
|---|---|---|---|
| 4,040,053 | 8/1977 | Olsson | 343/6.5 SS |
| 4,114,151 | 9/1978 | Denne et al. | 343/6.5 R |
| 4,196,418 | 4/1980 | Kip et al. | 343/6.5 SS |
| 4,223,830 | 9/1980 | Walton | 235/380 |
| 4,236,068 | 11/1980 | Walton | 235/380 |
| 4,333,072 | 6/1902 | Beigel | 340/825.54 |
| 4,384,288 | 5/1983 | Walton | 340/825.34 |
| 4,388,524 | 6/1983 | Walton | 343/6.5 R |

*Primary Examiner*—Donald J. Yusko
*Attorney, Agent, or Firm*—Gerald L. Moore

[57] ABSTRACT

A portable electronic identification system comprised of an identifier preferably of credit card size, and a fixed position reader which couples to it over short distances by space transmitted signals. The identifier card is energized from and the resulting signals are synchronized and detected by the reader. The identifier uses one loop antenna to both receive and send all signals, and provisions are made to prevent interference of these functions. The use of multiple radio frequencies greatly increases the data rate. Data that is unique to the authorized bearer is recorded in the identifier to minimize the likelihood of fraudulent use.

12 Claims, 5 Drawing Figures

SAMPLE TIMING CHART

READER STATION

ELECTRONIC IDENTIFICATION SYSTEM WITH POWER INPUT-OUTPUT INTERLOCK AND INCREASED CAPABILITIES

FIELD OF THE INVENTION

This invention relates to a radio signal coupled electronic identification system in which there is a portable electronic identifier and a reading station. The reading station serves as a source of power to the identifier in addition to receiving the identification and reporting the identification to a central system.

BACKGROUND OF THE INVENTION

This invention is an evolution of previous inventions by the same inventor, Charles A. Walton, as follows:

1. U.S. Pat. No. 4,223,830, titled "Identification System" and issued on Sept. 23, 1980;
2. U.S. Pat. No. 4,236,068, titled "Personal Identification and Signalling System", and issued on Nov. 25, 1980;
3. U.S. patent application Ser. No. 221,720, "Portable Radio Frequency Emitting Identifier", filed on Dec. 31, 1980; now U.S. Pat. No. 4,384,288.
4. U.S. patent application Ser. No. 06/264,856, "Identification System with Separation and Direction Capability and Improved Noise Rejection", filed on May 18, 1981; and
5. U.S. patent application Ser. No. 302,706, "Electronic Identification and Recognition with Code Changeable Reactance", filed on Sept. 16, 1981; now U.S. Pat. No. 4,388,524.

The above patents and patent applications are incorporated by reference in the subject application.

In application Ser. No. 302,706, it is shown that the antenna of an identifier can be used to both receive power from the reader station and radiate power to the reader, in one case at differing time intervals. It is also shown that the data can be sent on several differing radio frequencies, and the power be received on another radio frequency. Application Ser. No. 264,856 also shows data being transmitted from an identifier to the reader on several different radio frequencies.

Several problems arise with dual use of the identifier antenna for both receiving power and sending data. One is that while radiating information from the antenna of the identifier, the power-receive circuits are also connected to the antenna and may absorb useful energy from the sending circuit. Conversely, while the identifier is receiving power, the power radiation circuits may absorb useful energy and make the power reception function less efficient. A second problem is that messages from the identifier must be optimally synchronized with the power pulses from the reader. It is one of the objectives of the present invention to show how this dual use of the identifier antenna may be achieved, without harmful effects.

In application Ser. No. 264,856 and U.S. Pat. No. 4,236,068, a system is described in which two or more radio frequencies are used in an identifier, with the advantage that noise can be better rejected, and in which when four frequencies are used, then a doubling of the code bits is achieved within the same transmission time. This doubling occurs because each frequency can represent two bits, or four different values, rather than one bit for two values.

In patent application Ser. No. 264,856, is also described how fraud can be reduced if, within the card memory, there is recorded a description of the authorized bearer of the authorized bearer of the card, and this description is made readily available to a merchant processing a transaction. With this description the merchant may quickly check the appropriateness of the bearer. It is a further object of this invention to show that the same technique can be extended to include vehicle identification, so that within the memory of the card there is at least the license plate number of the automobile of the authorized bearer of the card. A gasoline station attendant selling gasoline is given a display of the card contents showing the recorded license number and can quickly verify that the card is being presented to purchase fuel for an authorized vehicle.

It is a further object of this invention to show that the data on the description of the authorized bearer may come from storage in the card and also from storage in the central recording point or from storage at the reading station.

It is a further object of this invention to show how the encoding function can be achieved with a matrix of diodes, any of which can selectively be "blown" or destroyed to create the desired code specific to the bearer and which includes the identification of the authorized bearer.

DESCRIPTION OF THE INVENTION

Figure 1:
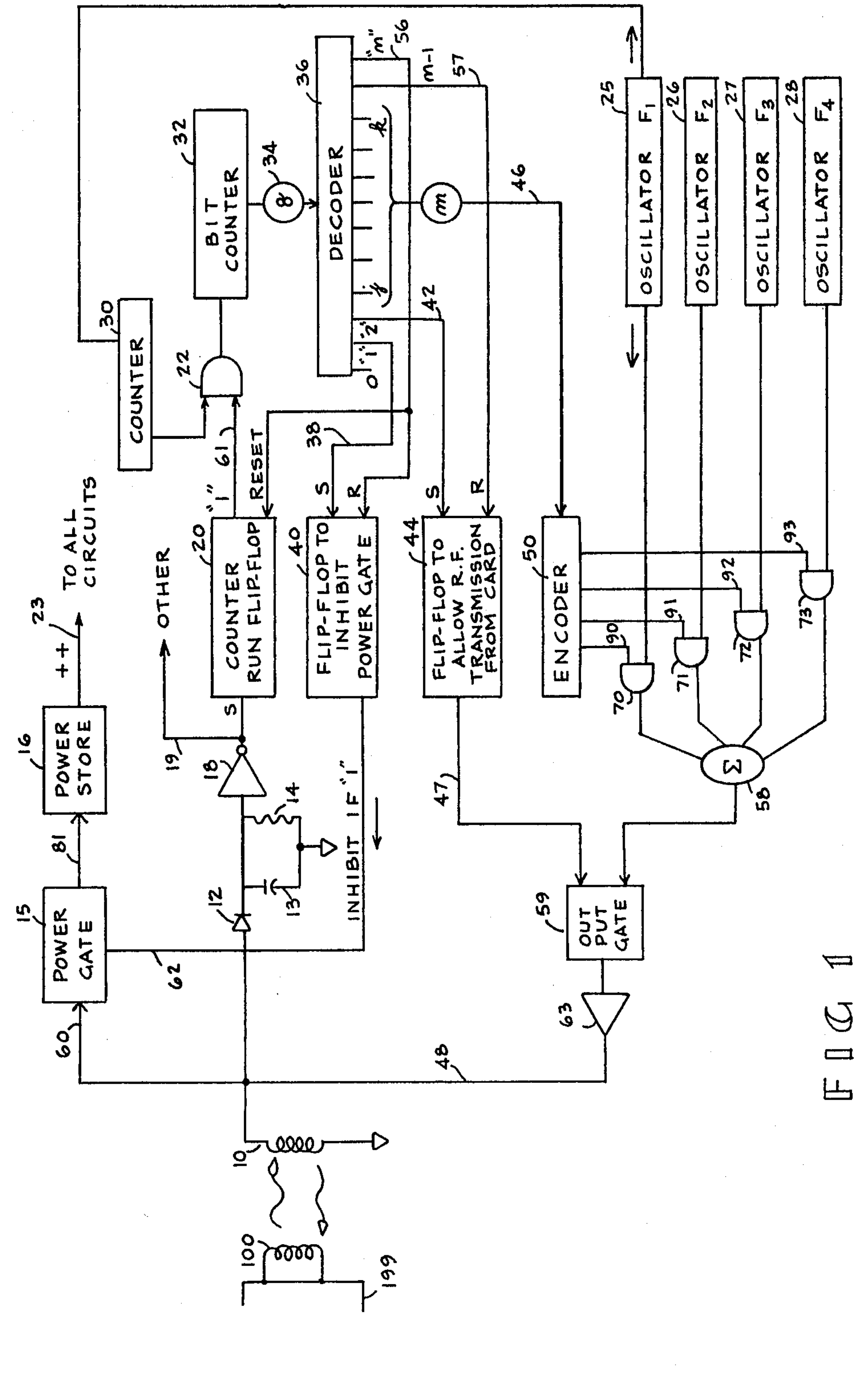
FIG. 1 shows the basic system of the identifier with power interlock.

The system embodying the present invention is comprised of two physically separate parts, an identifier 9 and a reader 199. The identifier, alternatively referred to as the card, preferably is constructed in the form of a credit card and is typically carried in the wallet or handbag of the authorized bearer. The reader, alternatively known as the reading station or as the receiver, is usually fixed in position and is somewhat larger and has a typical antenna diameter of six to eight inches. The identifier and reader couple together electrically, usually by inductive coupling, although electric dipole coupling will also work, between an identifier loop antenna 10 and a reader loop antenna 100, both of which are shown in FIG. 1.

In accordance with one feature of the invention, the identifier is supplied power from the reader 199 by use of radio signals transmitted through the antennas. To explain the operation, there is first a pulse of power transmitted as a radio signal at radio frequencies from the antenna 100 of the reader, which signal is picked up by the antenna 10 of the identifier 9. This power-receive pulse is rectified to direct current through a power gate 15, described later in FIG. 4, and D.C. energy is transmitted to and stored in a power store 16. This power store element 16 supplies operating power to the various circuits in the identifier 9. The power store element 16 is typically an electrolytic capacitor, or in the alternative can be a rechargeable storage cell having dimensions and construction similar to the Matsushita "paper battery" which is well known. A voltage regulator preferably is included in this power store element to regulate the voltage level supplied by the power supply.

The power-receive pulse is also rectified to D.C. by a diode 12 and a circuit including a capacitor 13, and a resistor 14 which allows recovery of this rectifying circuit between power-receive pulses. The voltage on the capacitor 13 operates an inverter 18 providing an output signal that is Down throughout the power-receive pulse. At the conclusion of the pulse, the output of the inverter 18 rises and sets a counter-run flip-flop 20. The output 19 of the inverter 18 will rise and fall with power pulses, except when data pulses hold the voltage on line 48 Up. This output 19 can be used to set other data store elements (not shown).

Figure 2:
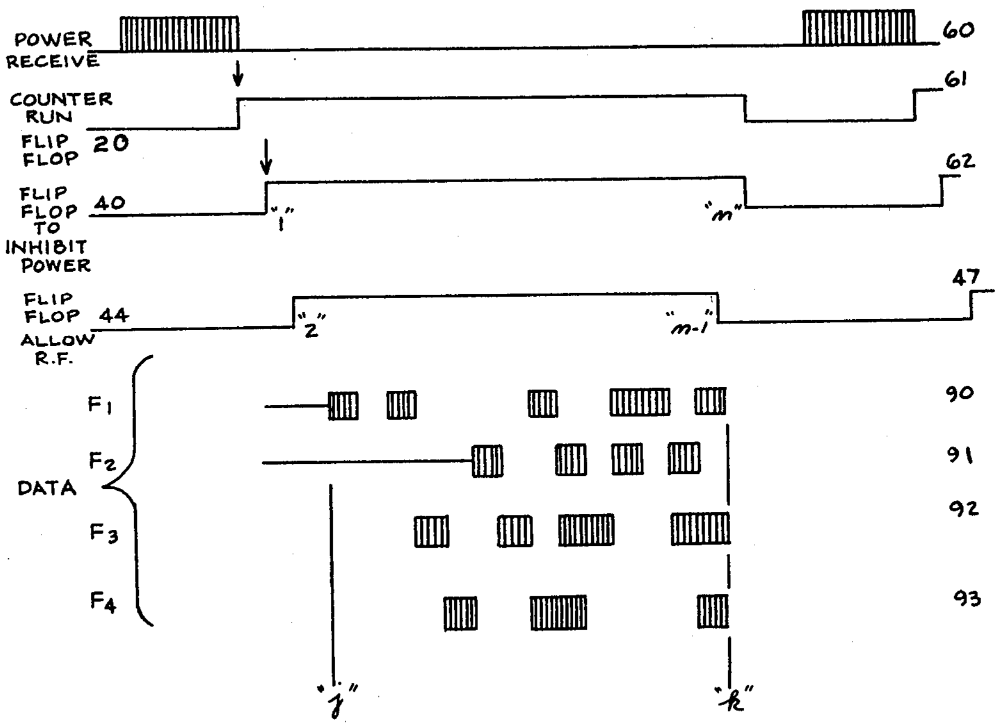
FIG. 2 is a timing chart for a sample modulation sequence of the identifier.

FIG. 2 is a timing diagram of the power-receive pulse and other timing signals to be described in the following paragraphs.

The presence of power in the card 9 initiates operation of the card to generate and transmit back to the reader signal. Two or more radio frequency oscillators, namely an oscillator 25 generating a frequency F1, and oscillators 26,27, and 28 for generating frequencies F2,F3, and F4, respectively begin oscillation when supplied power through the conductor 23. The signal F1 from the oscillator 25 is provided to a counter 30 which reduces the frequency of the signal to a rate at which data bits are to be transmitted, known as the bit pulse rate or bit-rate. The bit-rate pulses pass through an And gate 22 when the counter flip-flop 20 is set, to a bit counter 32. The stages of the counter 32 are typically master-slave flip-flops and count bit pulses in a conventional manner. A practical size of the counter for this application is five flip-flops, for a count capacity of thirty two. The value of the count is passed over five lines 34 to a decoder 36.

There are 32 lines (if q is five) from decoder 36, and these are shown on the figure as lines 0,1,2,"j" . . . "k", "n−1", and "n". As the count increases in counter 32, the output lines of the decoder 36 are successively energized. The central group of lines, bracketed between "j" and "k" is involved with transmission of data. The beginning and ending lines are concerned with interlocks and "housekeeping" functions as next described.

When the bit counter 32 advances to count 1, there is an output signal from the decoder 36 on it's position "1" or line 38 to set the flip-flop 40. The output of flip-flop 40 line 62 inhibits the power gate 15 to prevent any signal supplied to the loop antenna 10 from reaching and affecting the power store element 16. Further, when the transmission circuits of the card, to be described later, apply a signal to the loop antenna 10 there will be no loading of this antenna in an undesired way.

When the bit counter 32 advances to count 2, an output signal from decoder 36 is generated on position "2" or line 42. This output signal sets the flip-flop 44 which in turn sets the line 47 "up" and half-selects output gate 59. The encoding of the encoder 50 will be further described later in FIG. 3. The bit counter 32 now advances to the third position, also referred to as "j", which is the first of the set of lines 46 which connect with the encoder 50 and are labeled "j" through "k". The encoder 50 applies the desired intelligence to the final output signal.

Encoder 50 emits signals on lines 90,91,92, and 93 as will be explained in FIG. 3. These signals half-select And gates 70,71,72, and 73. The other terminals of the And gates are connected to oscillators 25,26,27, and 28, generating radio frequencies F1,F2,F3, and F4. One or more of these frequencies pass to a summing circuit 58, which sums the outputs from Gates 70,71,72, and 73. The output of the summing circuit goes to an Output Gate 59. The Output Gate 59, when selected by line 47, passes all the frequencies to the output amplifier 63 which in turn sends the signal to identifier antenna 10 for radiation from the identifier to the reader. The Output Gate 59 differs from a logic gate in having a linear distortion-free signal passing quality.

The timing diagram of FIG. 2 illustrates the aforedescribed sequence. The line 60 represents the power-receive pulse which initiates operation of the identifier and is repeated for each desired transmission. The Counter Run flip-flop 20 is set Up at the end of the power pulse, as represented by line 61, and terminates when a set of data has been transmitted. The flip-flop 40 to inhibit power flow to the power store is set Up at time "1" as represented by line 62, and line 47 represents the Up condition of the flip-flop 44 which allows RF transmission from the card. The lines 90,91,92, and 93 represent transmission of signal pulses in accordance with the coding of the card to be explained later. The frequency signals F1,F2, F3, and F4 are transmitted in a sequence responsive to the coding of the encoder 50, such encoding will be explained later.

Returning to FIG. 1, after the data pulse "k" is transmitted by the decoder 36, the next pulse, "n−1" is transmitted on the line 57 to reset the flip-flop 44 and cease all further transmission by the identifier card. The last pulse "n" transmitted on line 56 acts to reset the flip-flop 40 and the counter run flip 20, so the bit counter 32 stops advancing and the inhibit power gate 15 becomes conductive in anticipation of another power-receive pulse. Thus the decoder outputs are used not only to sequence the data, but also, first, to synchronize the beginning of data transmission with a step from 0 to 1 which cuts off the ability to receive power and a step from 1 to 2 which starts transmission; and, second, to synchronize the termination of transmission and reset the flip-flops for power and decoder sequencing in preparation for the next power pulse.

Figure 3:
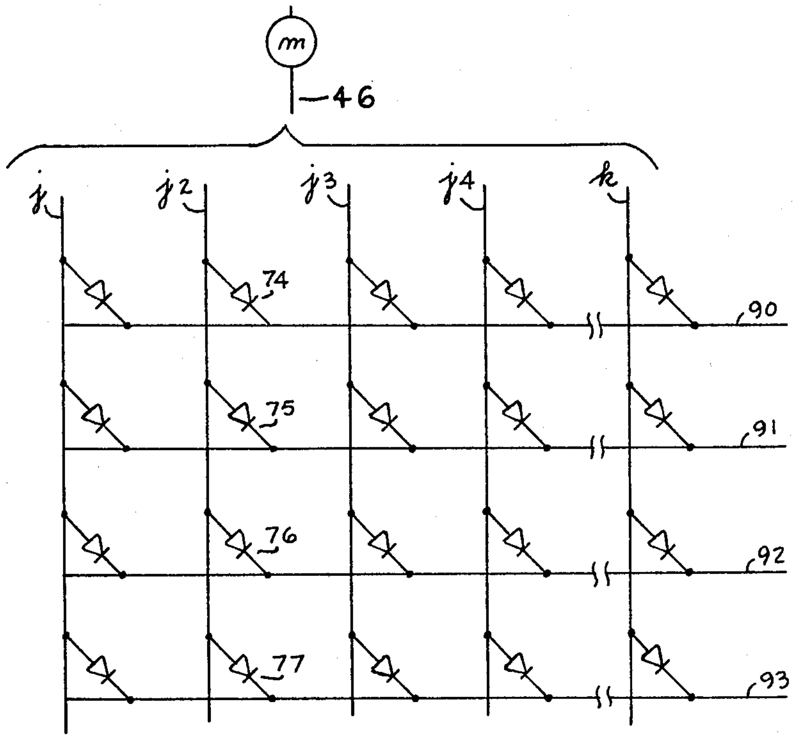
FIG. 3 is a schematic of one circuit for encoding the identifier signal.

In FIG. 3 is shown one embodiment of the encoder 50 which can be encoded to identify the identifier and distinguish it from all other identifiers. The encoder includes a grid of intersecting lines wherein the vertical lines "j" through "k" are the data lines connecting from the decoder 36. The four horizontal conductors 90,91,92, and 93 each terminate in And gates 70,71,72, and 73, respectively, and each And gate is connected with the RF oscillators 25, 26,27, and 28 respectively. Initially there is a diode at each intersection of the lines. For instance, associated with line "j2", which is the second encoding line or data pulse step, there are shown diodes 74,75,76, and 77.

Electrically, any positive voltage on a given data line "j" through "k" will pass through any diode whose anode is connected to that line, and from the diode's cathode to the connected horizontal line to half-select the connected And gate 70 through 73. The And gate so selected will emit the radio frequency present at its other input line, which is connected to one of the frequency generators 25 through 28. Thus, wherever in the matrix there is a diode present there will be a corresponding radio frequency pulse in the output signal for the duration of the bit time energizing that diode.

If each line "j" turns On only either F1 or F2, then one binary bit is transmitted for each "j" line. If a "j" line can turn on one of four frequencies, then two binary bits can be transmitted with the presence of a pulse on the "j" line. The binary values corresponding to the four frequencies are 00,01,10, and 11. With this concept of encoding, the procedure is to remove three of the four diodes in each bit or vertical line. The remaining diode determines the frequency to be transmitted. For example, if diode 75 is retained, and diodes 74,76, and 77 are deleted, then a logic pulse on line "j2" will send a logic pulse to line 91, which will complete And gate 71, and frequency F2 will pass through the gate 71 to the loop antenna 10 during the time the logic pulse is impressed on line "j2".

The coding may be extended by taking advantage of the capability of the system to radiate more than one radio frequency at a time. There are four oscillators in the example system energized all the time. If three diodes, namely 75,76, and 77 are retained, a pulse on line "j2" will cause the three oscillators 25,26, and 27 to radiate their frequency signals at the same time. The total number of combinations of radiation at the four different radio frequencies at a given bit time is 16, corresponding to four bits. If, then, the length of the output data signal is 27 bit positions from the decoder 36, the total number of bits of data that can be transmitted is 4 times 27 or 108.

One method of entering a desired code into the encoder 50 (this is sometimes known as "personalizing" the system) is to probe the horizontal and vertical conductors selectively and with an external signal destroy by overloading all unwanted diodes. This action is also known as "blowing" the diodes. This step of encoding the circuit can be performed near the end of manufacturing prior to shipment of the identifier to a selected customer. Diodes are used at each junction both to facilitate this "blowing" action and to prevent reverse current flow at unselected junctions, which can confuse the encoding function.

Figure 4:
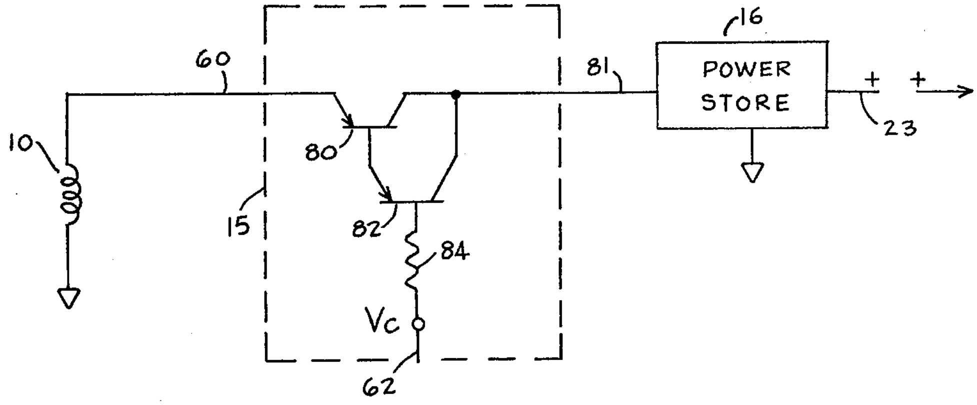
FIG. 4 is a circuit for one embodiment of the power gate.

In FIG. 4 is shown a circuit for the Power Gate 115. This gate serves to block or pass power signals received by the identifier from the reader and to isolate the power store when communications signals are impressed on the antenna by the identifier circuit. Its behavior is similar to that of a positive logic And gate, but it differs in that it conducts power rather than logic when On. The power gate 15 consists of two PNP transistors 80 and 82 connected in a Darlington circuit, and one base resistor 84. The power gate 15 is free to pass a power signal from the loop antenna 10 to the power storage 16 when the input connection 62 to resistor 84 is "down" (or at ground potential), in the following manner. A positive voltage applied to the input conductor 60 of the circuit, which is the emitter of the transistor 80, produces a nearly similar voltage at the base of the transistor 80, and this voltage is applied to the emitter of the transistor 82. This emitter voltage is passed through transistor 82 to the resistor 84. There results an overall positive voltage across the resistor 84, and a current flows to ground. This current in this Darlington configuration is sufficient, owing to the beta of each transistor, to render a low impedance between the input line 60 of the circuit and the output line 81 connecting to power store element 16 allowing current to flow from the antenna 10 to the power store element 16. This PNP configuration acts also as a rectifying diode by passing only positive voltage to the power store element 16. If the input command to line 62 is Up, due to an "inhibit" signal from the flip-flop 40, the net voltage across resistor 84 is zero, and there is no base current and no conduction across the circuit 15. The non-conducting mode is desired when the antenna 10 is transmitting a signal to the reader, and no loading of the transmitting circuit is desired.

Figure 5:
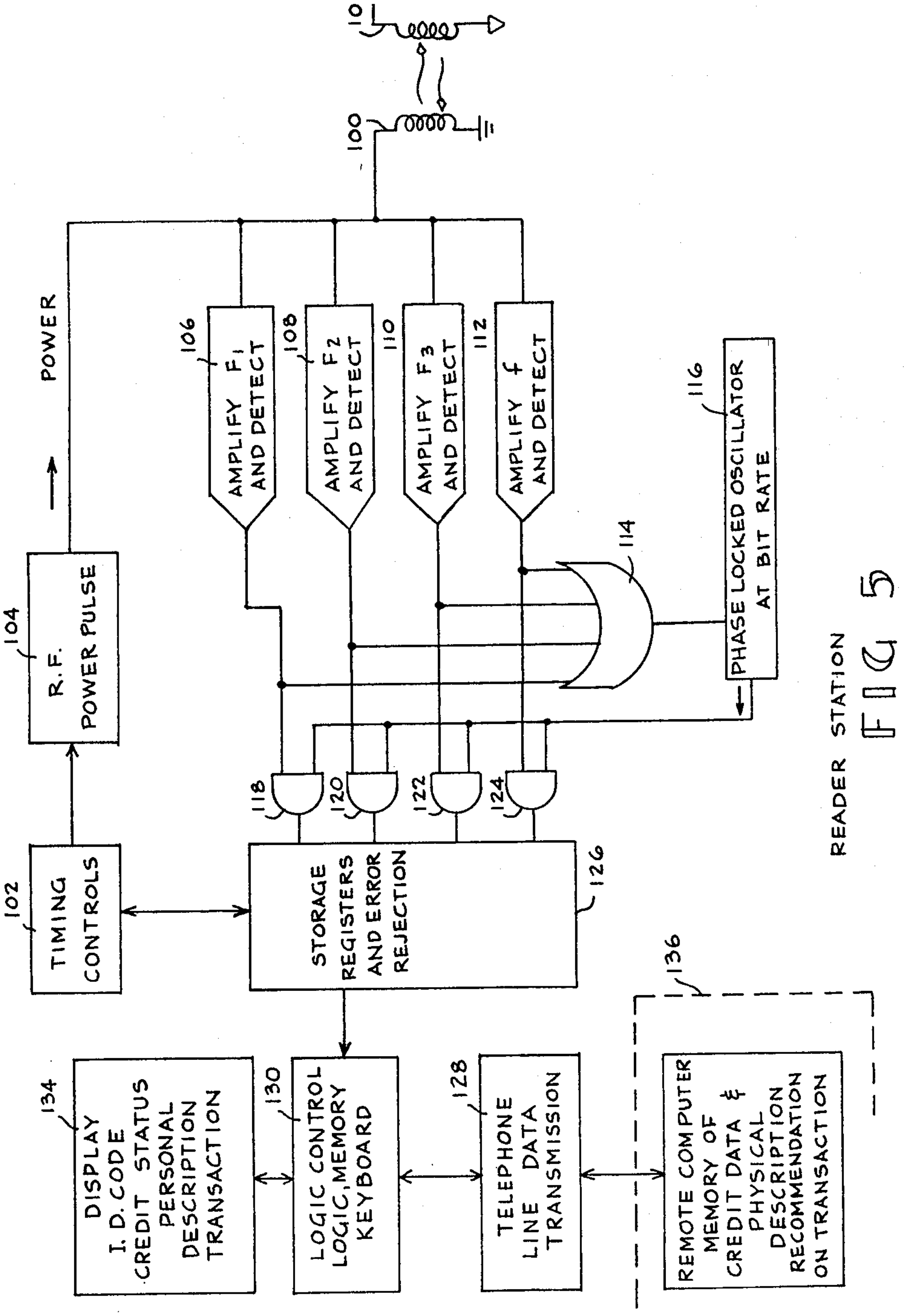
FIG. 5 is a block diagram of one embodiment of the reader station.

The reader station 199 is shown in FIG. 5 wherein the radiation element is a loop antenna 100. Periodically the timing control 102 emits a command to the RF power pulse source 104 and a power pulse is sent to the loop antenna 100. One choice of frequency for the power pulse is 13.65 MHZ which is in the "I.M.S." (Industrial, Medical, Scientific) band of frequencies in which the FCC allows large amounts of power to be radiated without a license. The power is radiated to the identifier 9 via the loop antenna 10 in a pulse as shown on line 60 in FIG. 2. At the end of the pulse, the reader 199 is in the mode to receive signals from the identifier 9.

The reader 199 contains four simplified radio receivers 106,108,110, and 112 tuned to and able to lock on the basic frequencies generated within the identifier. As an alternative to four individual receivers there may be a single swept frequency receiver. Each receiver responds to the corresponding frequency signals received, amplifies and detects these signals, and generates an output signal consisting of an associated audio data pulse. The pulses are OR'd in an Or gate 114 and drive a phase locked oscillator 116 which falls into phase and into step with the oscillator and bit counter circuits of the identifier 9. The phase locked oscillator 116 serves to gate the data pulses to the And gates 118,120,122, and 124 and this serves to enter the received date into the storage 126 in a controlled and orderly manner. The storage 126 not only stores the data, but also checks it for validity by comparison with formal patterns recorded in memory, and can correct some errors with error correcting codes, and can request additional reading cycles if there is any unexplained discrepancy. Such functions and circuits to perform such functions are commonly known. If given added capability, such as that provided by Local Control Logic 130, the reader can signal an alarm and perform such other functions as described previously in the referenced patents and patent applications. Another such function is telephone line data communications, as indicated by the "telephone transmission" element 128. A display 134 can also be provided to visually indicate the data received.

Of particular value in reducing theft is the ability to store in the card 9 information identifying the user. For example, the number and issuing state of the license plate of the authorized bearer of the card may be stored in the card. In gasoline station credit card applications, the attendant is provided with a display 134, perhaps of the LED or LCD or CRT type, which will display the license plate number as read from the card for the attendant to compare with the actual plate on the vehicle, thus assuring that the card is properly used with this vehicle.

Because it is virtually impossible to change the data values stored in the card, at least those values which have been inserted permanently by "blowing" diodes, fraudulent use of the card in connection with another vehicle is quite difficult. In exception cases, such as the use of the card with several vehicles, several license plate entries can be recorded on the card. It is valuable in preventing fraud to have a full physical description of the person presenting the card available to the merchant at the time of the transaction. The description may include not only physical data but other factors, such as voice description, profile, hand size, mother's maiden name, and may include vehicle description. The description is used by the merchant, gasoline station attendant, or any party reviewing the transaction to verify that the presenter of the card is the authorized bearer of the card. The data for this description and for verification may be delivered from within the card, or it may be obtained from local data storage of the merchant or other parties concerned with the specific transaction, or the data may be obtained from a central file which carries such information and data on all card holders.

FIG. 5 shows the provision for this local display 134. This display cooperates closely with the local control 130, which consists of the usual merchant or clerk station with a keyboard, memory. and logic. The station 130 communicates over telephone lines or other communication linkage 128 to a remote computer 136. The remote computer is the repository of physical descriptions of all card holders, and of credit status, and is able to make command decisions or recommendations to the merchant for the disposition of the transaction. The aforegoing technique of presenting a physical description at the time of the transaction is not limited to electronic identifier systems, but is also applicable to existing card systems using a magnetic stripe or manual entry of the transaction data.

I claim:

1. An electronic identification system, comprising, in combination:

a reading station including means to radiate a power pulse, and a portable identifier comprising:

an identifier antenna for receiving said power pulse from said reading station, and for transmitting a coded radio frequency signal from said identifier to said reading station;

a power store within said portable identifier;

a power gate circuit switchable for conducting or preventing conduction of said power pulse to said power store from said identifier antenna;

an encoder circuit energizable for generating said coded radio frequency signal;

an output gate circuit switchable for transmitting said coded radio frequency signal to said identifier antenna; and a control circuit energizable by said power store for controlling said circuits and for energizing said encoder circuit.

2. An electronic identification system as defined in claim 1 including means in said portable identifier to energize said control circuits and encoding circuit responsive to receipt of said power pulse by said identifier antenna.

3. An electronic identification system as defined in claim 2 including means for energizing said power gate to allow conduction through said power gate to said power store responsive to receipt of said power pulse by said identifier antenna.

4. An electronic identification system as defined in claim 3 including means responsive to receipt of said power pulse by said identifier for energizing said control circuit means.

5. An electronic identification system as defined in claim 1 in which said control circuit means generates a sequence of pulses.

6. An electronic identification system as defined in claim 5 in which the first of said sequence of pulses switches said power gate circuit to prevent conduction.

7. An electronic identification system as defined in claim 5 in which one pulse of said sequence of pulses switches said output gate circuit to pass said coded radio frequency signal to said identifier antenna.

8. An electronic identification system as defined in claim 7 in which some of the pulses of said sequence of pulses energize said encoder circuit to generate said coded radio frequency signal to include data signals of intermittent and selective duration.

9. An electronic identification system as defined in claim 8 in which said encoder circuit generates a coded radio frequency signal including a plurality of constant radio frequencies.

10. An electronic identification system as defined in claim 5 in which a pulse at the end of the said sequence of pulses switches said output gate circuit to halt transmission.

11. An identification system as defined in claim 5 in which a last pulse of said sequence switches said power gate to allow conduction of said power pulse.

12. An electronic identification system as defined in claim 5 wherein said encoder circuit can be selectively set to generate different coded radio frequency signals by providing an external signal to the encoder circuit.

* * * * *